(12) United States Patent
Stejskal

(10) Patent No.: US 7,284,656 B1
(45) Date of Patent: Oct. 23, 2007

(54) CAN EXTRACTOR APPARATUS

(75) Inventor: Jeffrey E. Stejskal, Modesto, CA (US)

(73) Assignee: Allied Machine, Inc., Modesto, CA (US)

( * ) Notice: Subject to any disclaimer, the term of this patent is extended or adjusted under 35 U.S.C. 154(b) by 224 days.

(21) Appl. No.: 11/127,777

(22) Filed: May 10, 2005

Related U.S. Application Data

(60) Provisional application No. 60/570,958, filed on May 12, 2004.

(51) Int. Cl.
*B65G 29/00* (2006.01)

(52) U.S. Cl. .................. 198/722; 198/450; 198/459.2; 99/364; 422/300

(58) Field of Classification Search .............. 198/450, 198/459.2, 723, 724; 99/360, 364, 365; 422/297, 422/300; 432/243
See application file for complete search history.

(56) References Cited

U.S. PATENT DOCUMENTS

| | | | | |
|---|---|---|---|---|
| 1,385,594 | A | * | 7/1921 | Thompson ............... 414/151 |
| 1,391,953 | A | * | 9/1921 | Hansen ..................... 426/405 |
| 1,510,544 | A | | 10/1924 | Chapman |
| 1,570,235 | A | * | 1/1926 | Fooks ......................... 99/362 |
| 1,612,893 | A | * | 1/1927 | Thompson ............... 198/441 |
| 1,808,017 | A | | 6/1931 | Chapman |
| 3,805,949 | A | | 4/1974 | Engdahl et al. |
| 3,815,490 | A | | 6/1974 | Barney, Jr et al. |
| 5,215,002 | A | | 6/1993 | Veltman |
| 5,533,438 | A | | 7/1996 | Veltman |
| 5,747,085 | A | * | 5/1998 | Veltman et al. ............. 426/233 |
| 6,257,820 | B1 | | 7/2001 | Veltman |
| 6,372,189 | B1 | * | 4/2002 | Stavig et al. ............... 422/302 |

OTHER PUBLICATIONS

Quadrant Engineering Plastics Guide, Products and Application Guide, Jan. 2003, pp. 12, 23, 39, www.quadrantepp.com.
Baynflax LTD., Rotary Drum Cooker Cooler, Technical data sheet, date unknown, 2 pages, www.baynflax.com.uk.
American Society of Mechanical Engineers, The FMC Rotary Pressure Sterilizer, May 17, 1982, 8 pages.
FMC Foodtech, Continuous Rotary Pressure Cookers and Coolers Brochure, date unknown, 4 pages, www.fmcfootech.com.

(Continued)

*Primary Examiner*—Mark A Deuble
(74) *Attorney, Agent, or Firm*—John P. O'Banion

(57) ABSTRACT

A can extractor for atmospheric rotary cookers and coolers has a clover wheel, a star wheel and a star wheel flange made of stainless steel. The clover wheel and star wheel are aligned and coupled to a sleeve rotating on a stationary shaft. The star wheel is coupled to the sleeve using an adjustable keyless hub/shaft locking device. The clover wheel and star wheel are spaced to accommodate bulging or deformed cans. A center discharge chute is supported on the rotating sleeve with a plastic bushing. Cans from the reel of a cooker/cooler are positioned with a can stripper between the star wheel and clover wheel while the reel rotates the clover wheel. The stainless steel components reduce scratching and eliminate transfer of rust to cans. A plastic clover wheel and a plastic star wheel flange are disclosed that do not scratch or transfer rust to the cans.

48 Claims, 9 Drawing Sheets

OTHER PUBLICATIONS

FMC Foodtech, Close Coupled Continuous Rotary Atmospheric Cooker/Cooler systems, Oct. 2002, 1 page, www.fmcfoodtech.com.
US Food and Drug Administration, Office of Regulatory Affairs, Guide to Inspections of Low Acid Canned Food Manufacturers, Attachment 7, Continuous Agitating Retorts, Apr. 1997, p. 78.
SlideRiteHT High Temperature Composite Material Brochure, 3 pages, source and date unknown.
GrayLon B520 Bearing material brochure, 3 pages, source and date unknown.
Tsubakimoto Chain Co., Tsubaki Power Lock Catalog, Apr. 2, 2004, (best copy available), 28 pages, http://www.tsubaki.ca/pdfs/powerlock.pdf.
US Tsubaki Inc., Tsubaki AS Series Power-Lock Instruction Manual, date unknown, 1 page.

* cited by examiner

CAN EXTRACTOR APPARATUS

CROSS-REFERENCE TO RELATED APPLICATIONS

This application claims priority from U.S. provisional application Ser. No. 60/570,958 filed on May 12, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to can processing machines, and more particularly to a novel can extractor for use in rotary cookers and coolers in the canning and food processing industry.

2. Description of Related Art

A can extractor is an apparatus that removes cylindrical cans of food product from rotary cookers and coolers typically used in the food processing industry. In this example, a rotary cooker/cooler is a horizontal cylindrical shell with a rotating cylindrical reel of parallel angle bars that push cans of food product along a spiral guide or thread mounted on the inside wall of the shell. In an atmospheric rotary cooker, hot or boiling fluid is used to cook or sterilize the food product in the can.

In a typical configuration, a star wheel and a clover wheel or a pair of parallel rotating star wheels between circular flanges are positioned at the extraction end of the shell and are synchronized to mesh with the angle bars of the reel to engage the can in the recess between two star points of the star wheels and move the can from a cooker to a cooler or from the cooler to a discharge chute.

In another configuration, a lobed gear wheel is positioned at the extraction end of the cooker/cooler and beneath the rotating reel. A can is pushed out of the reel by a lobe of the gear wheel poking between the angle bars of the reel and pushing the can through an opening in the cooker to a pocket valve or chute.

Many existing rotary cookers/coolers have been in service for decades. A mild steel is typically used for can handling components such as the flanges, and star wheels because mild steel parts are easy to fabricate at a reasonable cost. The extractors on these cookers are in continuous use during the canning season and subject to heavy use, excessive wear and are exposed to a wet, corrosive environment associated with food cookers. As a result, rust forms on the mild steel components at wear and contact surfaces. The rusty surfaces of the extractor transfer rust to the exterior of the cans during extraction causing damage, discoloration and potential contamination to the product resulting in rejection of product and revenue loss. It is not uncommon for food processors to replace most or all of the mild steel components of an extractor after each canning cycle due to wear and corrosion.

Another source of product loss associated with existing can extractors is scratching cans while in the extractor. Wear and corrosion on the mild steel star wheels and flanges develop into sharp edges and rough surfaces. As a can is moved from the reel to the extractor or from the extractor to a discharge chute, the can will rotate and contact these sharp edges and rough surfaces which can scratch the rotating can. A scratched can is typically rejected because it is cosmetically unmarketable or the location of the scratch can potentially contaminate the product. A tin alloy steel is typically used for food cans to resist scratches from the extractors. If scratching were minimized or eliminated in a particular food processing system, a tin-free steel (TFS) could be used at a great cost savings.

A further source of product loss is a can jammed in an extractor. Jams can result from failed parts, defective or bulging cans or misalignment of parts due to vibration or wear. If the jam is not quickly resolved, all the product remaining in the cooker can be ruined. If repetitive extractor jams cause significant delays in food processing, harvested food product can perish before it is canned and cooked.

Existing extractors are typically configured with a rotating sleeve of soft metal, such as brass, configured to rotate directly on a shaft. Keyways or set screws are used to couple the hubs of the flanges and star wheels onto the rotating sleeve. These couplings are not designed to give or slip. When a jam occurs, the torque transmitted through the keyways or set screws of the hubs can damage or distort the soft metal sleeve requiring immediate disassembly and replacement. Torque from a jam can also damage hubs or shafts requiring costly downtime and replacement. Further, the rotating sleeve must receive periodic lubrication or seizing can occur.

What is needed is a can extractor for a rotary cooker/cooler that does not scratch or transfer rust to the cans. Additionally, a can extractor that is easy to maintain, is not prone to jamming, and does not require significant downtime to clear a jam is desired.

BRIEF SUMMARY OF THE INVENTION

The present invention pertains to can extractors for use with rotary atmospheric cookers and coolers in the food processing industry.

One embodiment of the invention is a can extractor having a stainless steel clover wheel, a star wheel and hub flanges or plates that come in contact with the cans from the cookers/coolers. Stainless steel contact components completely eliminate the transfer of rust to the cans. The stainless steel components of the present invention also reduces scratching of cans because the liquid from the cooker/cooler on the stainless steel contact surfaces acts as a lubricant between the extractor component and the rotating can.

A new center bearing design is used which markedly increases the life of the extractor and minimizes sleeve damage due to a jam. In one embodiment, needle bearings are positioned to support the rotating sleeve on the center shaft with ports through the center shaft for lubrication. In another embodiment, a plastic bushing with internal lubrication are used to support the sleeve on the shaft. A bushing or bearing is used to support the stationary discharge chute on the rotating sleeve. A keyless shaft/hub locking device is used on the star wheel hub instead of set screws or keyways to align the star wheel with the clover wheel (timing lock) to provide uniform compressive force on the sleeve and limited slipping to minimize damage to the rotating sleeve if a jam occurs.

Another embodiment of the invention is a can extractor with a plastic clover wheel and plastic star wheel back plate that is configured to eliminate rust on contact surfaces, but with the added benefit of an "easy-touch" surface which eliminates most, if not all, scratching on the cans caused by contact with the extractor. With the elimination of scratching, the food processor is able to switch to tin-free steel (TFS) cans at a great cost savings. For example, during a normal 70 day run (an average canning season) a processor may run 200,000 cases per day, 6 cans per case, or 1,200,000 cans per day. A TFS can costs one cent ($0.01) less than a regular can. Thus, the processor would realize a savings of about $840,000 using the can extractor with plastic contact surfaces of the present invention during a regular canning season.

An embodiment of the invention is an apparatus for extracting cylindrical cans from an atmospheric rotary cooker/cooler with a rotating reel that comprises a stationary center shaft coupled to the rotary cooker/cooler and aligned with the axis of the rotating reel, a sleeve adapted to rotate on the center shaft, means for extracting cans from the rotating reel, the means for extracting coupled to the sleeve, the means for extracting driven by the rotating reel, means for stripping a cylindrical can from the reel, the means for stripping coupled to the center shaft, where the means for stripping is adapted to position a cylindrical can within the means for extracting, and means for aligning adapted to align the means for extracting on the sleeve.

Another aspect of the invention is where said means for extracting comprises a planar circular clover wheel having a plurality of lobes, the clover wheel adapted to couple to the sleeve, where the lobes of the clover wheel are adapted to mesh with the rotating reel, a star wheel having a plurality of recesses, the star wheel adapted to couple to the sleeve, where a recess of the star wheel is configured to receive a cylindrical can, where each recess of the star wheel is adapted to correspond to a lobe of the clover wheel, a planar circular back plate coupled to the star wheel, where the means for stripping is adapted to position a cylindrical can between the clover wheel and the back plate and within a recess of the star wheel, and where a cylindrical can is extracted from the rotating reel when the means for stripping strips a can from the reel and positions the can between the clover wheel and the back plate and within a recess of the star wheel, and the clover wheel rotates in response to rotation of the reel.

A further aspect of the invention is where the means for aligning comprises a keyless hub lock adapted to couple the star wheel to the sleeve, and where the keyless hub lock is adapted to align a recess of the star wheel to correspond to a lobe of the clover wheel.

A still further aspect of the invention is a discharge ramp positioned between the clover wheel and the star wheel, where the discharge ramp is adapted to intercept cans positioned between a lobe in the clover wheel and a corresponding recess in the star wheel, and means for supporting adapted to support the discharge ramp on the sleeve.

Another aspect of the invention is where the means for supporting comprises a plastic bushing.

A further aspect of the invention is where the means for supporting comprises a plurality of needle bearings.

A still further aspect of the invention is where the means for stripping a cylindrical can comprises a curved band having struts, the struts supported on the center shaft, where the curved band is positioned to align with the circumference of the back plate, where the curved band is oriented perpendicular to the center shaft, where the curved band is adapted to maintain a cylindrical can in a recess of the star wheel, the curved band having at least a distal end, and where the distal end of the curved band is adapted to intercept cylindrical cans positioned on the rotating reel.

A further aspect of the invention is where the star wheel, the back plate and the clover wheel comprise stainless steel.

A still further aspect of the invention is the back plate having a contact surface adjacent the star wheel, where the contact surface of the back plate is polished, the clover wheel having a contact surface facing the star wheel, and where the contact surface of the clover wheel is polished.

Another aspect of the invention is where the clover wheel is adapted to be reversible and both surfaces of the clover wheel are polished.

A further aspect of the invention is where the back plate and the clover wheel comprise plastic.

A still further aspect of the invention is where the back plate and the clover wheel comprise a nylon polymer embedded with molybdenum disulfide.

Another aspect of the invention is where the sleeve is supported on the central shaft by a sleeve bushing.

A further aspect of the invention is where the sleeve bushing material is selected from the group consisting essentially of a polyphenylene sulfide plastic, aramid reinforcing fibers, and polytetrafluoroethylene.

Another embodiment of the invention is an apparatus for extracting cylindrical cans from an atmospheric rotary cooker/cooler with a rotating reel that comprises a stationary center shaft coupled to the rotary cooker/cooler and aligned with the axis of the rotating reel, a sleeve, the sleeve adapted to rotate on the center shaft, a planar circular clover wheel having a plurality of evenly-spaced lobes, the clover wheel adapted to couple to the sleeve, where the lobes of the clover wheel are configured to mesh with the rotating reel, a star wheel adapted to adjustingly couple to the sleeve, where the star wheel has a plurality of evenly-spaced recesses, where each recess of the star wheel is adapted to correspond to a lobe of the clover wheel, a planar circular back plate coupled to the star wheel, means for stripping a cylindrical can from the reel, the means for stripping coupled to the center shaft, where the means for stripping is adapted to position a cylindrical can between the clover wheel and the back plate and within a recess of the star wheel, and where a cylindrical can is extracted from the rotating reel when the means for stripping strips a can from the reel and the clover wheel rotates in response to rotation of the reel.

A further embodiment of the invention is an apparatus for extracting cylindrical cans having a rim at each end from an atmospheric rotary cooker/cooler with a rotating reel that comprises a stationary center shaft coupled to the rotary cooker/cooler and aligned with the axis of the rotating reel, a sleeve adapted to rotate on the center shaft, a clover wheel hub coupled to the center sleeve, a clover wheel coupled to the clover wheel hub, the clover wheel having a plurality of evenly spaced lobes, where the lobes are adapted to mesh with the rotating reel, a planar star wheel flange coupled to the sleeve, a star wheel adjustably coupled to the star wheel flange, where rotation of the star wheel is synchronized with rotation of the clover wheel through the sleeve, the star wheel having a plurality of evenly spaced points, a circular recess positioned between each two adjacent points, where each recess on the star wheel corresponds with a lobe on the clover wheel, where each recess on the star wheel is adapted to receive one rim of a cylindrical can, where the star wheel and the clover wheel are spaced apart to receive a cylindrical can, a curved band having struts, the struts supported on the center shaft, the curved band positioned to align with the circumference of the star wheel flange, the curved band oriented perpendicular to the center shaft, the curved band having at least a distal end, and where the distal end of the curved band is adapted to intercept a rim of a cylindrical can positioned on the rotating reel.

Another embodiment of the invention is an apparatus for extracting cylindrical cans from an atmospheric rotary cooker/cooler with a rotating reel that comprises a stationary center shaft coupled to the rotary cooker/cooler and aligned with the rotating reel, a sleeve adapted to rotate on the center shaft, a clover hub coupled to the sleeve, a clover wheel coupled to the clover hub, the clover wheel having a plurality of evenly spaced lobes, where the lobes are adapted to mesh with the rotating reel, a star wheel flange coupled to the sleeve with a keyless hub/shaft locking device, a star wheel coupled to the star wheel flange, where the star wheel has a plurality of evenly-spaced circular recesses, where each recess on the star wheel is aligned to correspond with a lobe on the clover wheel by adjusting the keyless hub/shaft locking device, where the star wheel and the clover wheel are spaced apart to receive a cylindrical can, a can stripper having struts, the struts supported on the center shaft, where the can stripper is positioned to align with the circumference of the star wheel flange, where the can stripper is oriented perpendicular to the center shaft, where the can stripper is adapted to maintain a cylindrical can in a recess of the star wheel, the can stripper having at least a distal end, and where the distal end of the can stripper is adapted to intercept cylindrical cans positioned on the rotating reel.

A further aspect of the invention is where the sleeve is adapted to rotate on the center shaft with a plurality of needle bearings, and where the sleeve comprises stainless steel.

A still further aspect of the invention is where the center shaft comprises a plurality of lubrication ports that fluidly communicate with the needle bearings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts, and that the method may vary as to the specific steps and sequence, without departing from the basic concepts as disclosed herein.

Figure 1:
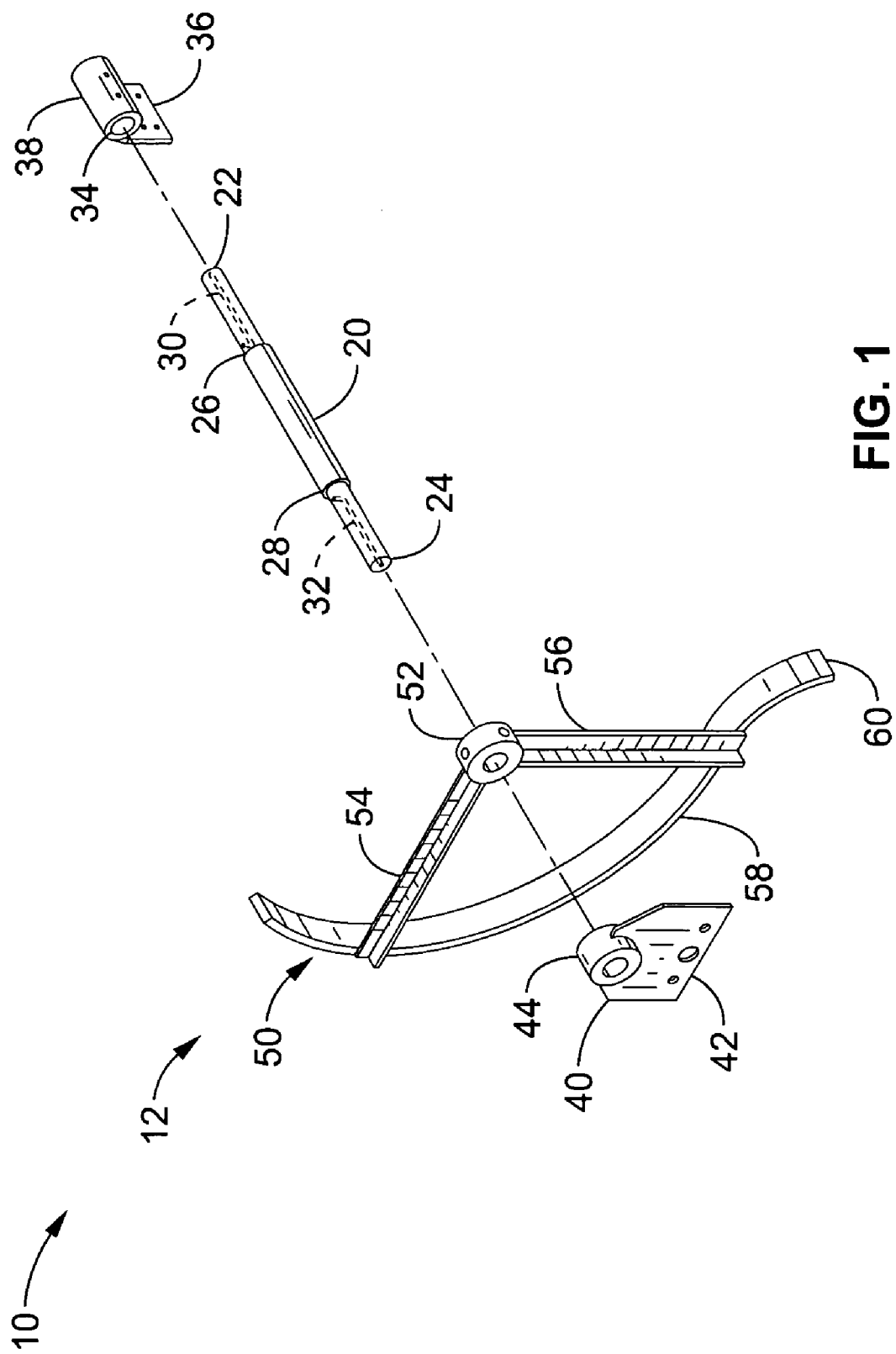
FIG. 1 is an exploded view of a first sub-assembly of a can extractor according to the present invention and showing the center shaft, support brackets and can stripper.
Figure 2:
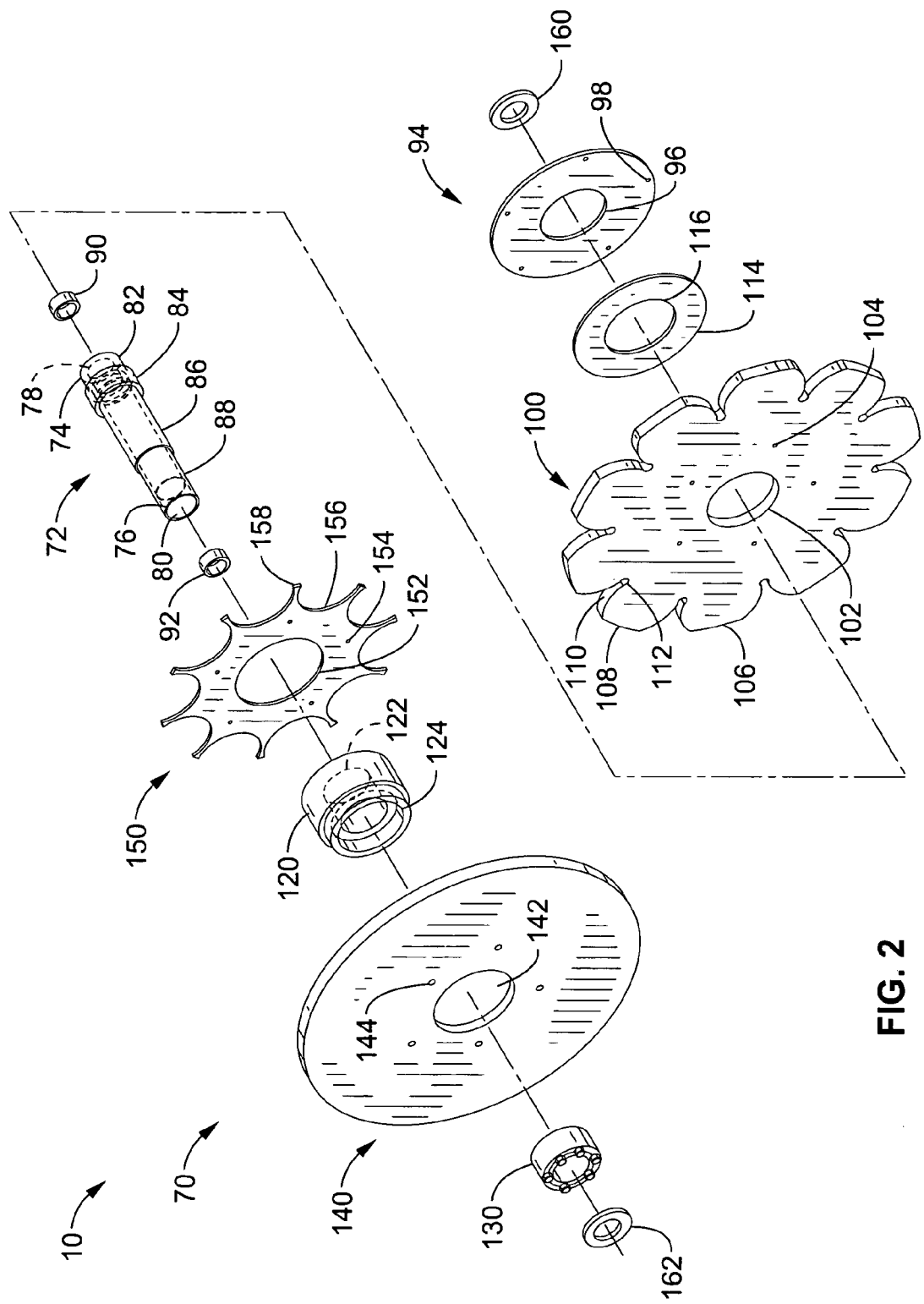
FIG. 2 is an exploded view of a second sub-assembly of a can extractor showing a rotating sleeve, star wheel and clover wheel made of stainless steel that mount on the sleeve and bearings to support the sleeve on the center shaft shown in FIG. 1.
Figure 3:
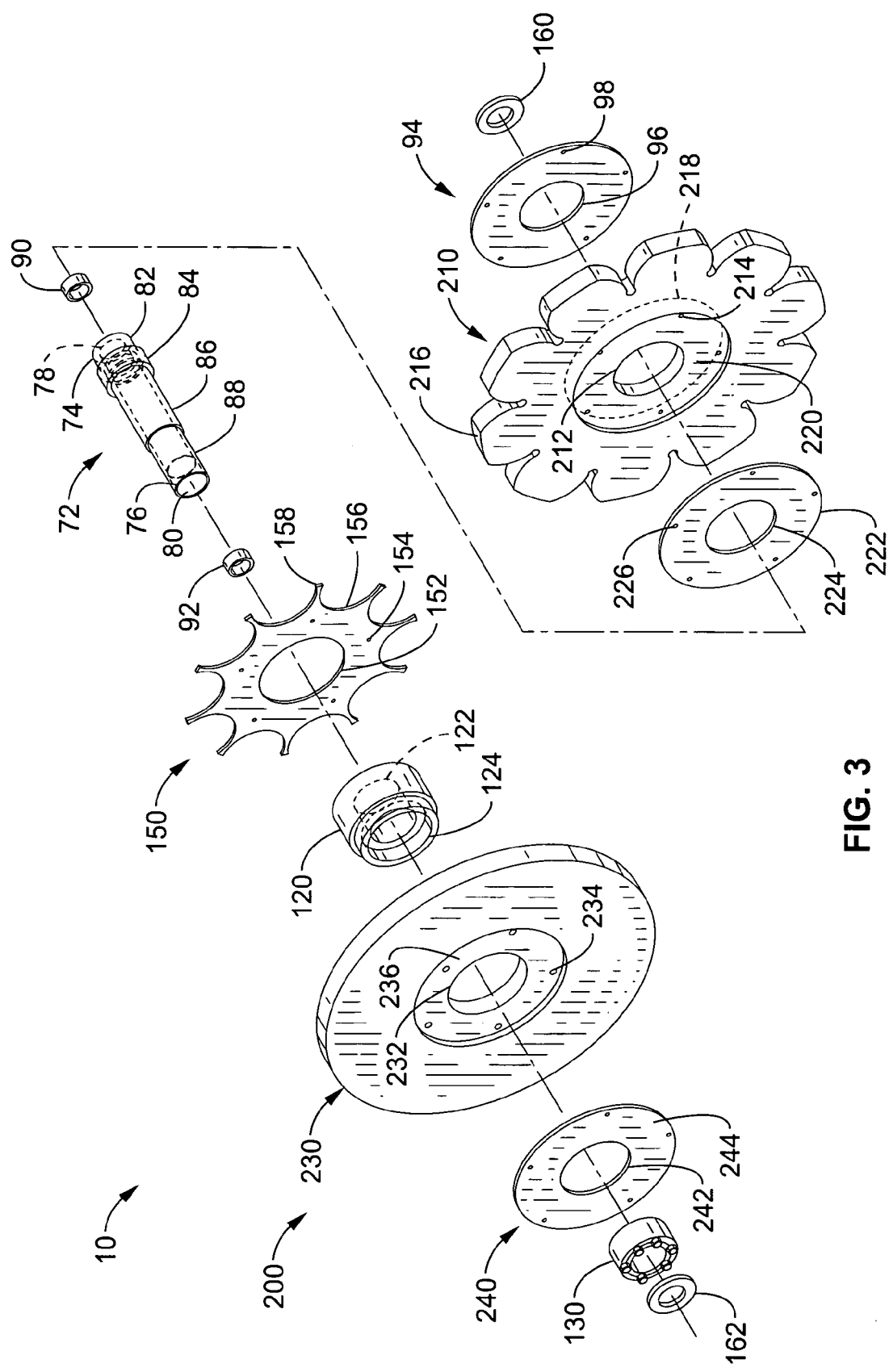
FIG. 3 is an exploded view of another embodiment of a second sub-assembly of a can extractor similar to that shown in FIG. 2 and showing a clover wheel and star wheel back plate comprising plastic.
Figure 4:
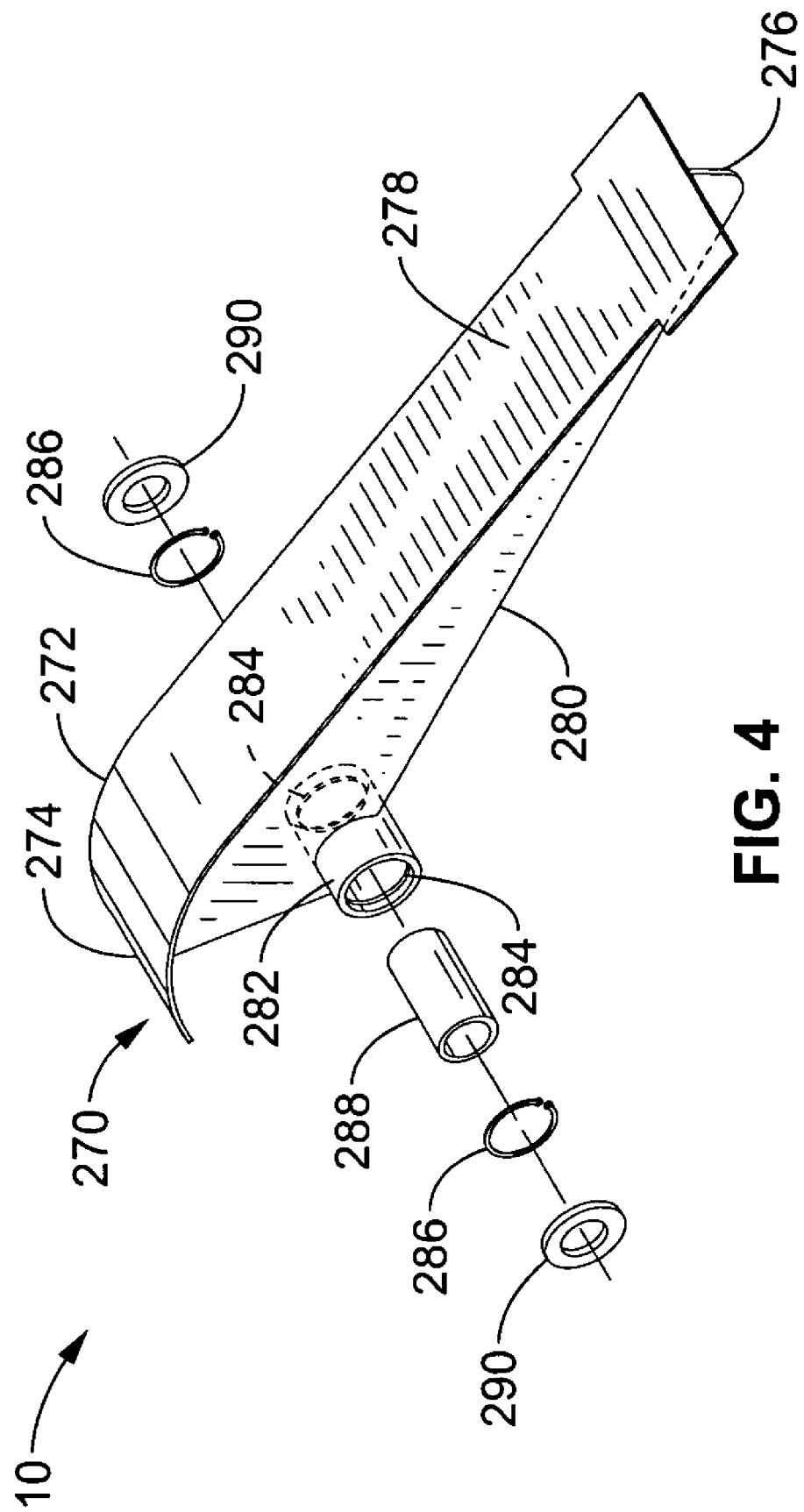
FIG. 4 is an exploded view of a third sub-assembly of the can extractor showing a discharge ramp assembly supported by a bushing on the rotating sleeve shown in FIG. 2 and FIG. 3.

FIG. 1 through FIG. 4 are exploded views of the components of a can extractor according to the present invention and generally designated as 10. In order to better understand the relationship of the can extractor components, FIG. 1 illustrates a first sub-assembly consisting of a central shaft and stationary components coupled to the shaft. FIG. 2 illustrates a second sub-assembly comprising a rotating sleeve and stainless steel can handling components coupled to the sleeve that rotates on the center shaft shown in FIG. 1. FIG. 3 illustrates another embodiment of a second sub-assembly comprising can handling components made of plastic coupled to the rotating sleeve. FIG. 4 illustrates a third sub-assembly for a discharge chute that is stationary and is supported on the rotating sleeve described in FIG. 2 and FIG. 3.

Referring first to FIG. 1, can extractor 10 has sub-assembly 12 that consists of a center shaft 20 with an inboard end 22 and an outboard end 24. Shaft 20 is divided into about thirds by an inboard shoulder 26 and an outboard shoulder 28 as shown. A lubrication port 30 extends through the center of shaft 20 from inboard end 22 to about inboard shoulder 26 and is fluidly connected to the outside of center shaft 20. A similar lubrication port 32 is positioned in the outboard end 24 and extends to about outboard shoulder 28. In a preferred embodiment, lubrication ports 30, 32 are adapted to receive a grease fitting. An inboard mount 34 has flange 36 and a hub 38 configured to support and couple to inboard end 22 of shaft 20. An outboard mount 40 has a flange 42 and a hub 44 configured to support and couple to outboard end 24 of shaft 20. Can stripper assembly 50 has a center hub 52 configured to couple to shaft 20 near the outboard end 24. Horizontal and vertical angle iron struts 54, 56 radiate from hub 52 and support a can stripper 58. Can stripper 58 is a curved steel band shaped in a circular cord, coupled to the ends of horizontal and vertical struts 54, 56 and having a lip 60 positioned below the end of vertical support 56 and curving downward. The function of can stripper assembly 50 will be further described in FIG. 5.

FIG. 2 is an exploded view of a sub-assembly 70 that is supported on shaft 20 shown in FIG. 1. Rotating sleeve 72 has inboard end 74 and outboard end 76. In a preferred embodiment of the invention, rotating sleeve 72 is stainless steel. The interior of rotating sleeve 72 has inboard bearing recess 78 at inboard end 74 and outboard bearing recess 80 at outboard end 76. The outside diameter of sleeve 72 changes from inboard end 74 to outboard end 76 to accommodate various components. Starting at inboard end 74 is a segment 82 with a first outside diameter, next a segment 84 of larger diameter, then a segment 86 of small diameter and then a segment 88 with the smallest relative diameter ending at outboard end 76.

Inboard bearing 90 is configured to fit in bearing recess 78 of sleeve 72 and mount on shaft 20 against shoulder 26 (see FIG. 1). Inboard bearing 90 is configured to receive lubrication through inboard lubrication port 30 (see FIG. 1) and can be lubricated during operation. Outboard bearing 92 is configured to fit in bearing recess 80 of sleeve 72 and mount on shaft 20 against shoulder 28 (see FIG. 1). Outboard bearing 92 is also configured to receive lubrication through outboard lubrication port 32 (see FIG. 1). In a preferred embodiment of this invention, bearings 90, 92 are needle bearings. In a further embodiment, the needle bearings are heavy duty and preferably stainless steel.

Circular clover hub flange 94 is positioned at the inboard end 74 of sleeve 72 and has a center aperture 96 that is configured to couple directly to sleeve 72 on inboard segment 82, preferably by welding. Clover hub flange 94 has a plurality of mounting holes 98 positioned radially about center aperture 96.

Circular clover wheel 100 is preferably stainless steel with polished surfaces and has a center aperture 102 configured to fit on segment 84 of sleeve 72. A plurality of mounting holes 104 are positioned to match mounting holes 98 in clover hub flange 94. A plurality of evenly-spaced lobes 106 are positioned around the circumference of clover wheel 100. Lobes 106 are generally dimensioned to about the diameter of the can to be extracted. Each lobe 106 also serves as a gear tooth interacting with the angle bars of the reel in a rotating cooker (see FIG. 5). Thus clover wheel 100 is the drive wheel for sleeve 72. Depending on the configuration of the rotary cooker and dimensions of the can to be extracted, each lobe 102 has a flattened top profile 108, curved edges 110, and an undercut aperture 112 to provide clearance with the edges of angle bars of the cooker. The number of lobes 106 can vary based on the can diameter and size of the rotary cooker. In one embodiment, clover wheel 100 is made of stainless steel and has ten lobes 106. A circular spacer plate 114 with aperture 116 adapted to fit over segment 84 of sleeve 72 is positioned between clover hub flange 94 and clover wheel 100 and has a thickness based on the can to be extracted and spacing of the extractor. Circular spacer plate 114 typically has a diameter less than the diameter of the mounting holes 98 in clover hub flange 94. In another embodiment (not shown), circular spacer plate 114 comprises individual small spacers or washers positioned on each mounting hole 98 in clover hub flange 94.

Now moving to the outboard end 76 of sleeve 72, Star wheel hub 120 has inboard recess 122 configured to fit onto outboard segment 88 of sleeve 72 and an outboard recess 124. Outboard recess 124 is larger in diameter than inboard recess 122 and is configured to accommodate the outer diameter of keyless hub lock 130. Details of keyless hub lock 130 are described in FIG. 7. Keyless hub lock 130 secures star wheel hub 120 to the outboard end 76 of sleeve 72.

Star hub flange 140 is preferably stainless steel and has center aperture 142 that is configured to couple with the outside of star wheel hub 120, preferably by welding. In one embodiment, star wheel hub 120 and star hub flange 140 are designated as a single star wheel flange or back plate component. A plurality of mounting holes 144 are positioned radially about center aperture 142 of star hub flange 140.

Star wheel 150 is preferably made of stainless steel has a center aperture 152 configured to fit on star wheel hub 120 and has a plurality of mounting holes 154 that mate with mounting holes 144 on star hub flange 140. Star wheel 150 has a plurality of circular cut-outs or recesses 156 on the circumference, each cut-out 156 having a radius larger than the can to be extracted and is positioned with each recess 156 corresponding to a lobe 106 on clover wheel 100. Between each cut-out 156 is a blunt star point 158. In a preferred embodiment (not shown), the trailing edge of star points 158 are further rounded. The spacing of star points 158 matches the spacing of undercut apertures 112 on clover wheel 100 and when assembled, star points 158 are aligned with undercut apertures 112. In a preferred embodiment, the radius of each star point 158 from the center of star wheel 150 is slightly greater than the radius of under cut apertures 112 from the center of clover wheel 100.

Inboard, spacers 160, are sized to fit on shaft 20 (see FIG. 1) and are used to separate inboard flange 34 and rotating inboard end 74 of sleeve 72. Outboard spacers 162 are sized to fit on shaft 20 and separate outboard flange 40 and rotating keyless hub lock 130. In a preferred embodiment, spacers 160, 162 are brass or bronze washers in further embodiments, spacers 160, 162 are thrust washers.

In operation, the polished stainless steel surfaces of clover wheel 100, star hub flange 140 and star wheel 150 do not rust and therefore cannot transfer rust to the cans. These polished stainless steel surfaces are lubricated by the hot fluids of the rotary cooker/cooler and this combination of stainless steel and lubrication provides unexpected benefits by reducing or eliminating scratching on the surfaces of cans handled in the extractor.

In another embodiment (not shown) the curved edges 110 of clover wheel 100 are powder coated with a hardening material to reduce contact wear.

FIG. 3 illustrates another embodiment of a second subassembly designated as 200 with plastic contact components. Subassembly 200 has a rotating sleeve 72 as previously described in FIG. 2. Circular clover hub flange 94 is preferably welded to the inboard end 74 of sleeve 72.

Clover wheel 210 is a dense plastic material and has center hole 212 with radial mounting holes 214 matching mounting holes 98 in clover hub flange 94. Clover wheel 210 has lobes 216 configured the same as lobes 106 shown in FIG. 2. For added strength, plastic clover plate 210 is preferably thicker than the stainless steel clover wheel 100 shown in FIG. 2. Clover wheel 210 has circular recesses 218 on the inboard surface and recess 220 on the outboard surface. Recess 218 is configured to receive clover hub flange 94 when assembled. A clover top plate 222 is configured with center hole 224 and mounting holes 226. Clover top plate 222 mounts on segment 84 of sleeve 72 and fits in recess 220 and below the outboard surface of clover wheel 210. Clover wheel 210 is secured between clover hub flange 94 and clover top plate 222 when assembled.

Star wheel back plate 230 is preferably made of a dense plastic material and has center hole, 232, a plurality of mounting holes 234 and an outboard recess 236. Star wheel back plate 230 is about the same diameter as star hub plate 140 in FIG. 2 but has a greater thickness. Star wheel back plate 230 has a circular recess 238 on the outboard surface.

Star hub flange 240 has a center aperture 242 and a plurality of mounting holes 244, and is coupled to outboard hub 120, preferably by welding. Star hub flange 240 has an outer diameter adapted to fit within circular recess 238 on star wheel back plate 230. When assembled, star wheel back plate 230 is secured between star hub flange 240 and star wheel 150. In another embodiment (not shown), countersunk screws are used to fasten star points 158 to star wheel back plate 230 for added rigidity.

In one embodiment, clover wheel 210 and star wheel back plate 230 are composed of a nylon material embedded with molybdenum disulphide for strength and lubrication. An example is Nylatron® GSM PA6. The nylon material with molybdenum disulphide has internal lubrication that provides superior benefits in handling cans without scratching and with minimal or no friction which can lead to jamming. In operation, the contact surfaces of plastic clover wheel 210 and plastic star wheel back plate 230 are further lubricated by the fluid used in the cooker/cooler to provide a relatively soft, non-scratching lubricated surface to the cans moving through the extractor.

FIG. 4 is an exploded view of a preferred third subassembly 270 for a center mounted discharge ramp. Discharge ramp 272 has front end 274 and tail end 276. Ramp deck 278 is preferably curved at the front end 274 and straight at the tail end 276. Ramp deck 278 is supported on ramp support structure 280. Support structure 280 has bushing socket 282 located near the front end 274. When mounted on a rotary cooker/cooler, tail end 276 of discharge ramp 272 is preferably coupled to a stationary structure or device for receiving or conveying cans (not shown). A protective housing (not shown for clarity) is preferably positioned around discharge ramp 272 for safety. Bushing socket 282 is positioned on support structure 280 at front end 274 and has annular grooves 284 positioned at each end of bushing socket 282 to receive retainer rings 286. A bushing 288 is configured to fit on rotating sleeve 72 (shown in FIG. 2 and FIG. 3) at segment 86 and act as a bearing to allow discharge ramp 272 to remain stationary while sleeve 72 rotates. In this embodiment, bushing 288 is self lubricated and does not require periodic lubrication during operation. The use of a bushing 288 between bushing socket 282 and rotating sleeve 72 provides superior performance compared to existing systems where bushing socket 282 is supported directly on rotating sleeve 72 and must be periodically lubricated.

In a preferred embodiment, bushing 288 is made of a self lubricating dense plastic such as polyphenylene sulfide (PPS). One example is Techtron® HPV, a bearing grade PPS. In another less preferred embodiment, a bushing of aramid reinforcing fibers, high temperature resin and solid lubricants, such as SlideRite HT® is used. In a further less preferred embodiment, a bushing of polytetrafluoroethylene (PTFE) material is used.

Spacers 290, preferably made of brass or bronze, are positioned at each end of bushing socket 282 to prevent rubbing of the star wheel hub 120 and the shoulder of segment 84 of sleeve 72 against bushing socket 282. In another embodiment (not shown), spacers 290 are made of a self lubricating plastic such as PPS. In an exemplary embodiment (not shown), extractor 10 is configured to move cans from a rotary cooker to an adjacent rotary cooler, the discharge ramp assembly is not present and the can stripper 58 (shown in FIG. 1) is shortened and modified accordingly.

Figure 5:
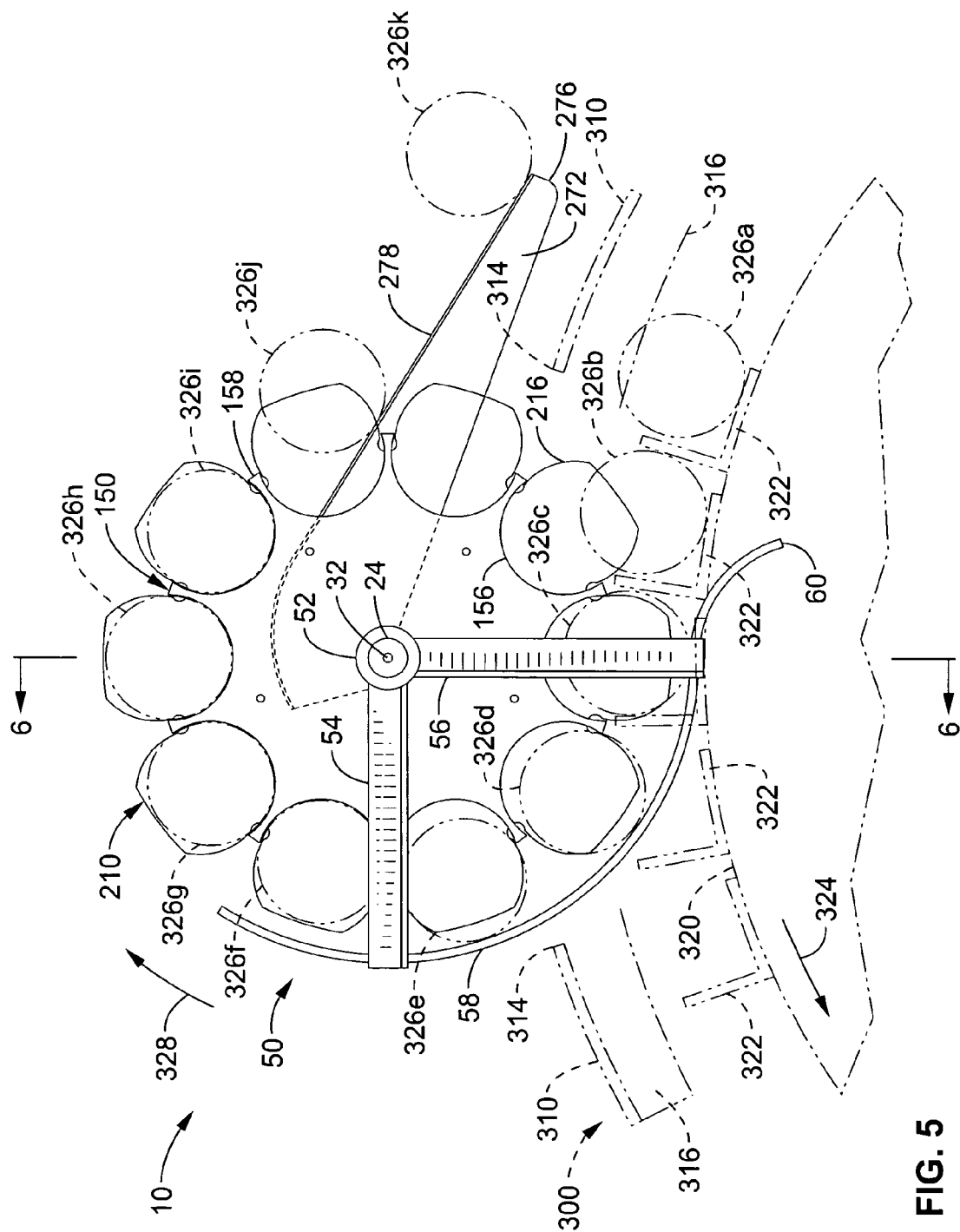
FIG. 5 is an end view of the assembled can extractor shown in FIG. 1 through FIG. 4 and mounted on the top of a rotary cooker at the extraction end.
Figure 6:
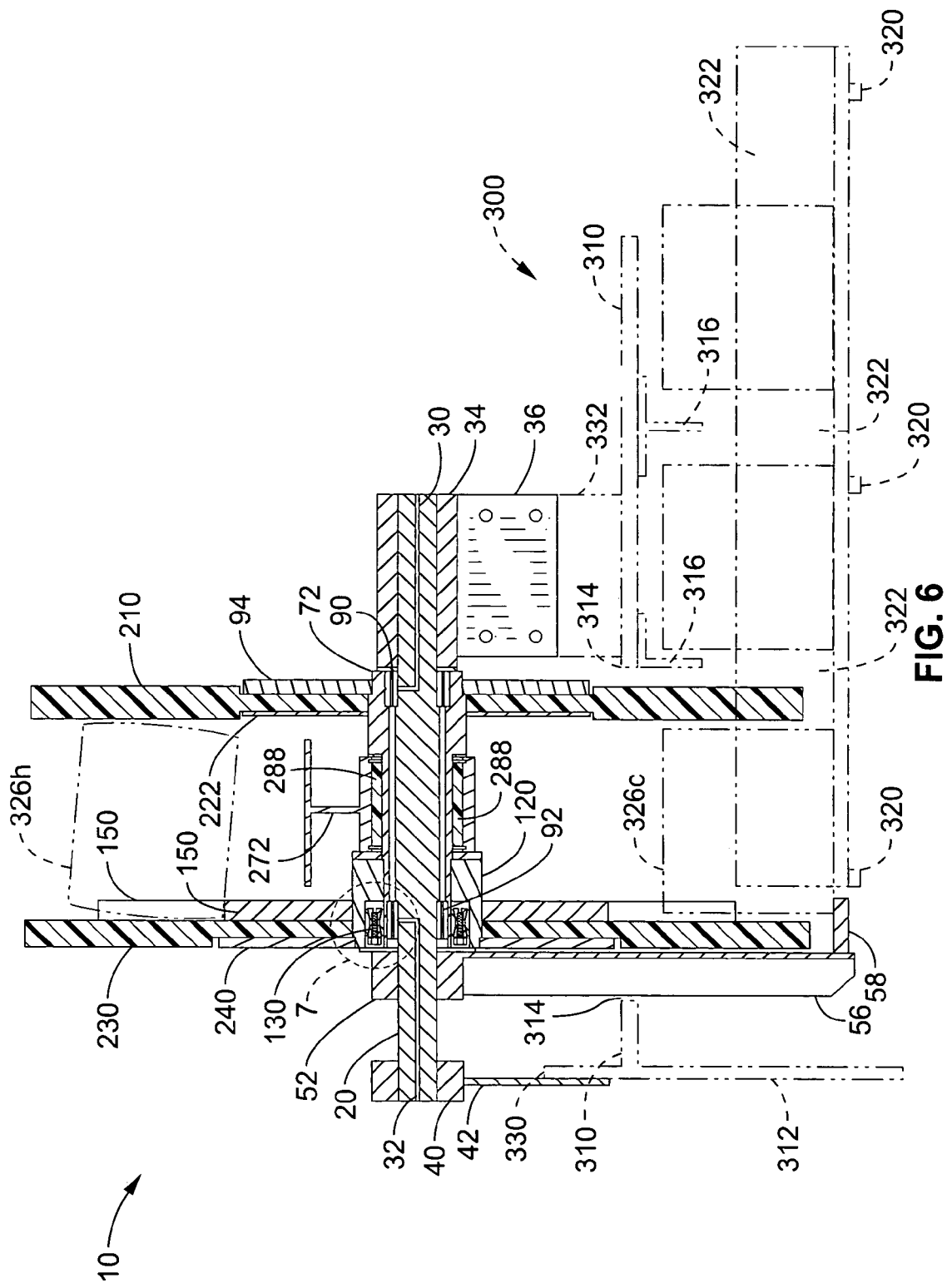
FIG. 6 is a side cut away view of the can extractor shown in FIG. 5 and taken at line 6-6.

FIG. 5 illustrates an end view of can extractor 10 mounted to a rotary cooker 300 and FIG. 6 illustrates a cut-away view of the can extractor 10 shown in FIG. 5 and taken at line 6-6. Rotary cooker 300, shown in phantom, forms no inventive aspect of the invention and is of a type generally found in the food processing industry. Generally, the invention is compatible with any rotary processing equipment including sterilizers, cookers, coolers, and preheaters. In many applications, extractor 10 will be encased in a sheet metal safety housing that is mounted on cooker 300, but a housing is omitted from FIG. 5 and FIG. 6 for clarity.

In FIG. 5, Rotary cooker 300 has a cylindrical shell 310 with an input end (not shown) and an extraction end 312 (see FIG. 6). An opening 314 in the top of cylindrical shell 310 near the extraction end 312 is configured to accommodate extractor 10. A thread 316 with a "T" shaped cross section (see FIG. 6) is configured in a continuous spiral from the input end (not shown) to extraction end 312 on the inside circumference of shell 310.

A cylindrical reel 320, typically comprised of a plurality of parallel wheels and has a plurality of angle bars 322 attached to the wheel rims and positioned longitudinally along the length of reel 320. Reel 320 is mounted on a central shaft (not shown) and rotates in the direction indicated by arrow 324. Angle bars 322 are spaced on the circumference of reel 320 to accommodate sealed food cans, here designated 326a through 326k, as they are pushed along the thread 316.

Assembled can extractor 10 is illustrated in an end view with outboard flange 40 and star hub flange 140 not shown for clarity. In the center of can extractor 10 is outboard end 24 of center shaft 20. Lubrication port 32 can be observed in the center of shaft 20 and is preferably equipped with a grease fitting (not shown).

Hub 52 of can stripper 50 is mounted to center shaft 20 and with horizontal strut 54 and vertical strut 56 supporting can stripper 58. Lip 60 of can stripper 58 is positioned adjacent to the end of reel 320 (see FIG. 6) and extends below angle bars 322.

At the inboard end of can extractor 10, clover wheel 210 is positioned so that angle bars 322 mesh between lobes 216 and rotate clover wheel 210 in a direction designated by arrow 328. Star wheel 150 is synchronized with clover wheel 210 through coupling with rotating sleeve 72 (not shown) and aligned so that circular recesses 156 align with lobes 216. Discharge ramp 274 is shown mounted between star wheel 150 and clover wheel 210 on bushing 288 (not shown) and positioned to discharge cans to the right and to a further can receiver or conveyance (not shown).

As cans 326a and 326b move along thread 316 and between angle bars 322, star recess 156 and lobe 216 are synchronized to rotate between angle bars 322. As can 326c passes lip 60 of can stripper 58, it is lifted and positioned with the outboard end in a star recess 156 and the inboard end against a lobe 216. Can 326d and 326e are illustrated pushed along can stripper 58 by a star point 158. Can 326f falls back against a star recess 156 when it rotates above about 90 degrees in the extractor. Cans 326g, 326h and 326i have their outboard end resting in a star recess 156 and their inboard end resting against a lobe 216 of clover wheel 210 as can be seen for can 326h in FIG. 6.

The side of can 326*j* has contacted the ramp deck 278 of discharge chute 272 and rolls down and away from star recess 156 that is rotating downward as star wheel 150 continues to turn in direction of arrow 328. Can 326*k* is shown rolling on its side down ramp deck 278 and out of extractor 10 towards a can conveyance or receiver (not shown) connected to tail end 276 of discharge ramp 272. In an exemplary embodiment (not shown), can extractor 10 is configured to move cans from cooker 300 to an adjacent cooler (not shown) and discharge ramp 272 is not present.

FIG. 6. is a cross section view of the can extractor 10 and rotary cooker 300 shown in FIG. 5 and taken at line 6-6.

Rotary cooker 300 has a cylindrical shell 310 with an input end (not shown) and an extraction end 312. An opening 314 in the top of cylindrical shell 310 near the extraction end 312 is configured to accommodate extractor 10. A thread 316 with a "T" cross section is configured in a continuous spiral on the inside circumference of shell 310, but transitions to an "L" shape near opening 314 to avoid conflict with extractor 10.

A cylindrical reel 320 (shown here as parallel rims) has a plurality of angle bars 322 on the outer circumference and that run longitudinally along the length of reel 320. Reel 320 is mounted on a central shaft (not shown).

Inboard flange 34 is mounted on shell 310, preferably with flange 42 coupled to a mating flange 330 on shell 310. Outboard flange 40 is mounted to extraction end 312 of shell 310, preferably with inboard flange 36 mounted to a mating flange 332 on the shell 310. Center shaft 20 is supported between inboard, outboard flanges 34, 40 and over opening 314. Can stripper hub 52 is mounted on center shaft 20 inboard of flange 40 and positioned so that steel strip 58 is adjacent to the extraction end of angle bar 322 in cooker 300.

Sleeve 72 is mounted on bearings 90, 92 and is free to rotate in response to interaction of clover wheel 210 with angle bars 322 of reel 320. Clover hub flange 94 is preferably welded to sleeve 72 and star wheel hub 120 is coupled to sleeve 72 preferably with keyless hub lock 130 at the outboard end. Star wheel hub flange 240 is preferably welded to star wheel hub 120. Plastic star wheel back plate 230 is shown mounted between star wheel hub 120 and star wheel 150. Plastic clover wheel 210 is shown mounted between clover hub flange 94 and clover top plate 222. Discharge ramp 272 is supported on bushing 288 which is in turn supported on rotating sleeve 72.

Can 326*c* is shown positioned at the bottom of extractor 10 on angle bar 322 and partially supported at the outboard end by can stripper 58. Can 326*c* is positioned in a recess 156 of star wheel 150 (see FIG. 5.)

Can 326*h* is shown positioned at the top of extractor 10 and before intersecting discharge chute 272. Can 326*h* is supported on the outboard end in a recess 156 of star wheel 150. The inboard end of Can 326*h* is supported against the outboard surface of clover wheel 210. Notice that the spacing between star wheel 150 and clover wheel 210 is greater than the length of can 326*h*. This spacing accommodates misshapen cans and cans with bulging ends without jamming. A non bulging can 326*h* will typically be supported in a tilted position by clover wheel 210 and recess 156 of star wheel 150.

Figure 7:
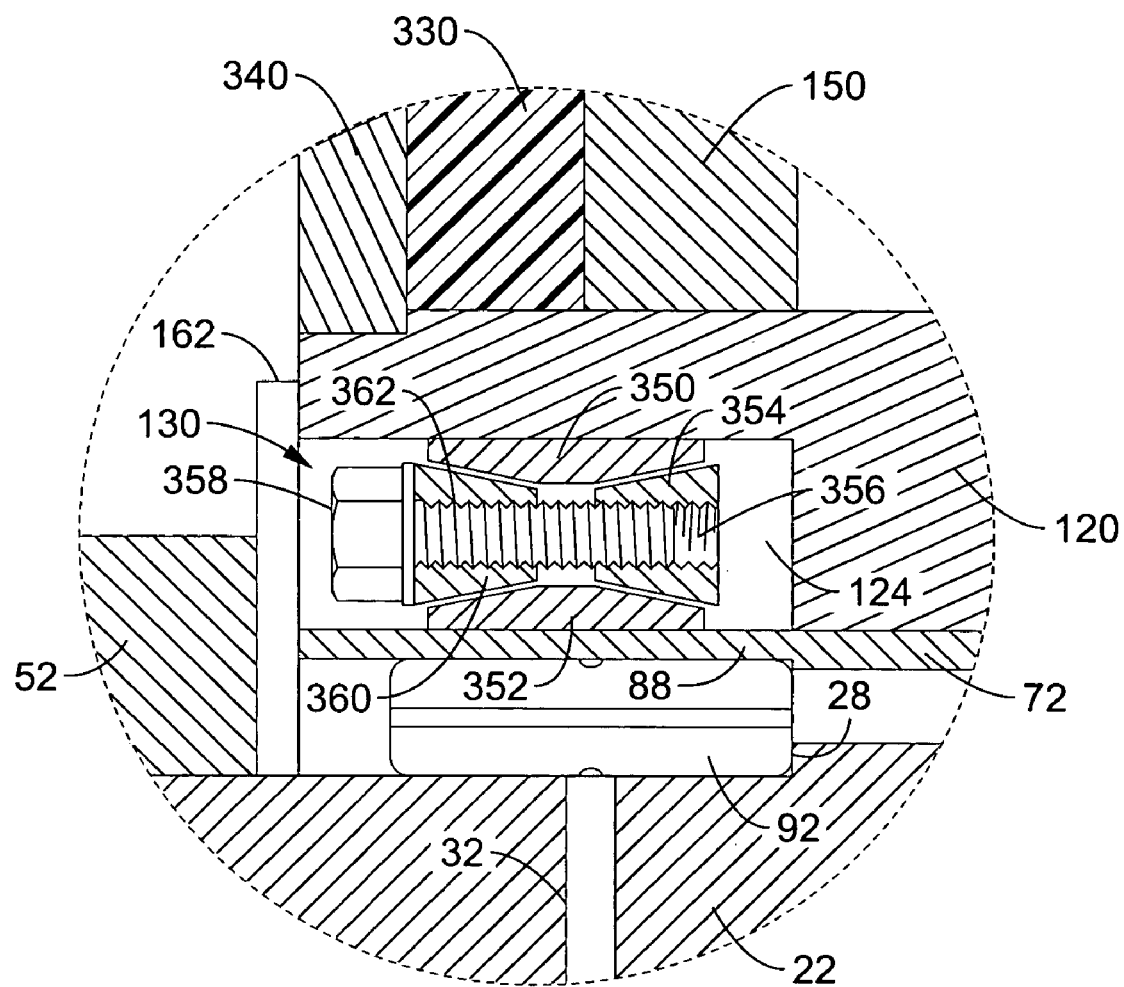
FIG. 7 is a detailed view of a keyless hub lock designated as broken circle 7 in FIG. 6 and used to couple the star hub to the rotating sleeve shown in FIG. 2 and FIG. 3.

FIG. 7 illustrates a detail cross section view of a keyless hub lock 130 as designated as broken circle 7 in FIG. 6 and previously referenced in FIG. 2 and FIG. 3. Keyless hub lock 130, also known as a keyless hub/shaft locking device, is used to couple star hub 120 to sleeve 72 and provide means for alignment and adjustment of star wheel 150 relative to clover wheel 210 (not shown). If a jam occurs or as parts wear due to use, small alignment adjustments are facilitated by adjusting keyless hub lock 130.

Keyless hub lock 130 comprises four rings and is positioned on sleeve 72 and within outboard recess 124 of star hub 120. Outside ring 350 has a flat outer surface sized to fit outboard recess 124 and a double taper convex inner surface. Inside ring 352 has an inside surface sized to fit the outside diameter of segment 88 of sleeve 72 and a double tapered convex outside surface. Inboard ring 354 has tapered sides to fit between rings 350, 352 and mate with the tapered surfaces of outside ring 350 and inside ring 352. A plurality of threaded holes 356 in inboard ring 354 accommodate adjustment screws 358. Outboard ring 360 has tapered sides to fit between rings 350, 352 and mate with their tapered surfaces, and a plurality of aligned holes 362 to accommodate a plurality of adjustment screws 358.

When adjustment screws 358 are tightened, inboard outboard rings 354, 360 are drawn together and exert outward wedging force on inside, outside rings 350, 352. By adjusting the wedging force against inside, outside rings 350, 352, they can be configured to slip at a predicted level of torque force between the star hub 120 and sleeve 72, such as when a jam occurs. This slipping action during a jam will occur before deformation or damage to sleeve 72, star hub 120, and other parts of the extractor. The keyless hub lock 130 can be used to quickly realign the clover wheel 100 and star wheel 150. In an exemplary embodiment (not shown), the outside diameter of spacer 162 is about the diameter of sleeve 72 and a circular cover is positioned between spacer 162 and can stripper hub 52 that extends over spacer 162 to keep foreign material out of keyless hub lock 130.

In comparison, conventional systems with two parallel star wheels and keyways on the sleeve do not allow slipping between the sleeve and a hub. The hub, sleeve or keyways are subject to serious damage if excess torque is applied through the sleeve. Hubs with set screws will score, twist or damage the sleeve if excess torque is applied through the hub and, in many cases, necessitate complete replacement of the sleeve. A twisted or deformed sleeve can also score the shaft thus requiring shaft repair or replacement.

Figure 8:
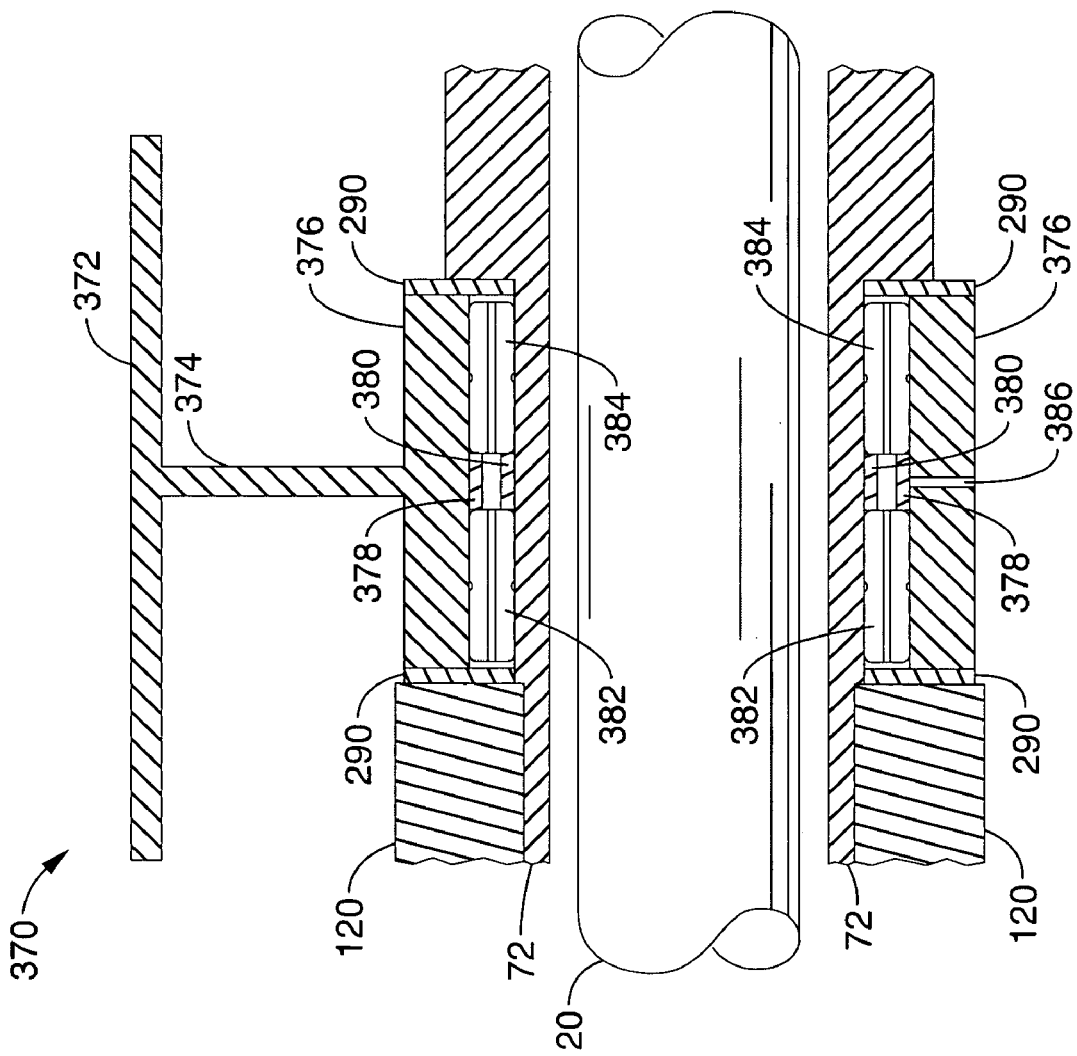
FIG. 8 is a side cut away view showing a discharge ramp as shown in FIG. 4 supported by bearings on the rotating sleeve.

FIG. 8 illustrates a side cut away view of another embodiment of a bearing system for a discharge chute 370. Sleeve 72 with hub 120 is mounted on shaft 20 as shown previously in FIG. 6. Discharge ramp 370 has ramp deck 372, support web 374 and bearing hub 376. Outer and inner spacing sleeves 378, 380 are positioned near the center of bearing hub 376. Left, right bearings 382, 384 are mounted on rotating sleeve 72 and in the respective ends of bearing hub 376. Outer and inner spacing sleeves 378, 380 are positioned to keep bearings 382, 384 from migrating to the center. Spacers 290 are positioned on rotating sleeve 72 and at each end of bearing hub 376 to retain bearings 382, 384 in bearing hub 376. A lubrication port 386 is positioned in bearing hub 376 to provide lubrication to bearings 380, 382. In a preferred embodiment, bearings 380, 382 are heavy duty stainless steel needle bearings and used in conjunction with the stainless steel clover wheel 216 shown in FIG. 2.

Figure 9:
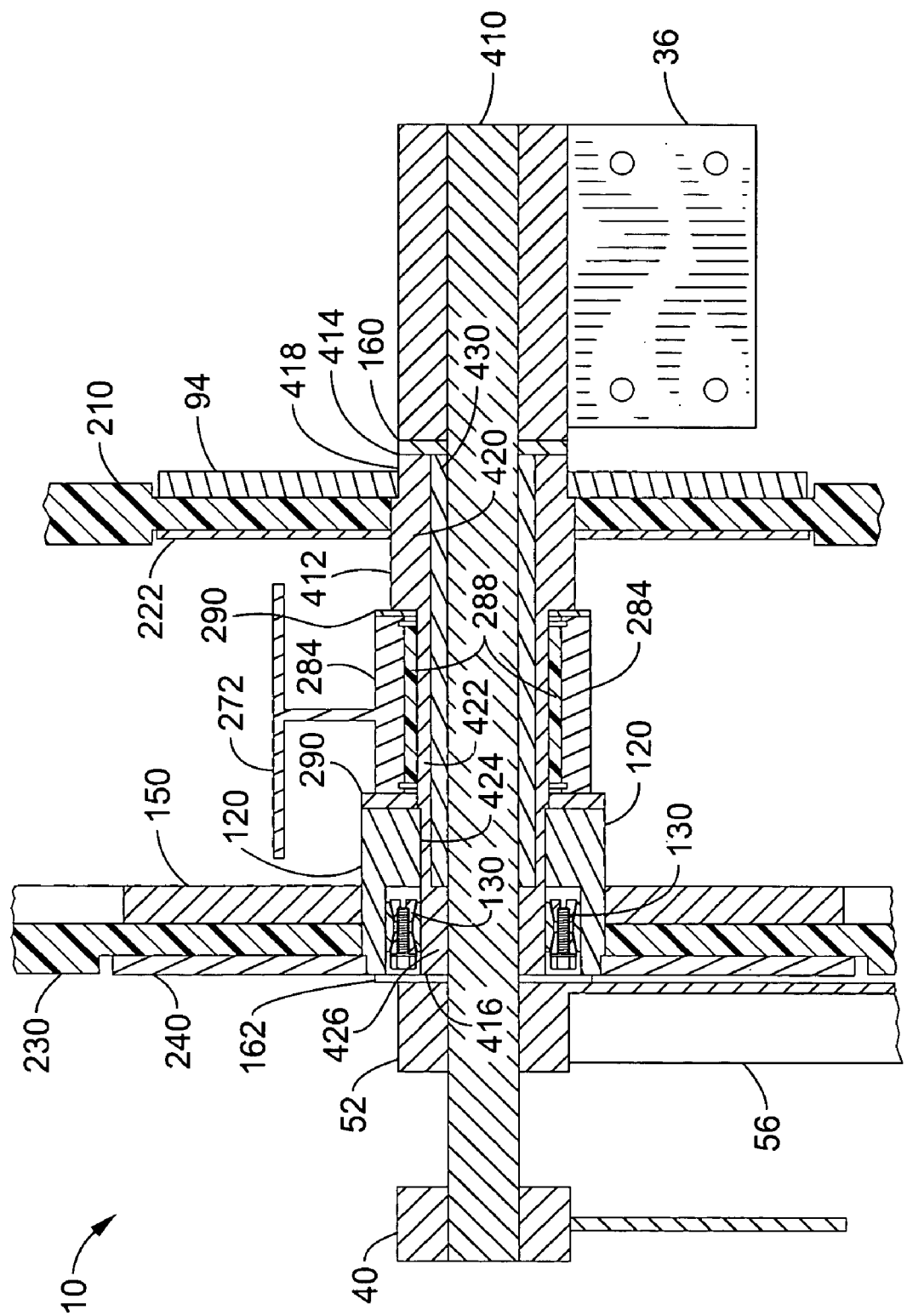
FIG. 9 is a side cut away view of the can extractor shown in FIG. 6 with the rotating sleeve supported on a bushing.

FIG. 9 illustrates a side cut away view of another embodiment of a can extractor 10 as illustrated in FIG. 6 with bushing support instead of bearing support. Can extractor 10 is supported on shaft 410 that is uniform in diameter. A rotating sleeve 412 has inboard end 414 and an outboard end 416. The interior diameter of rotating sleeve 412 is uniform. Starting at inboard end 414 is a segment 418 with a first outside diameter, next a segment 420 of larger outside diameter, then a segment 422 of small outside diameter and then a segment 424 of smaller outside diameter and finally a segment 426 of smallest inside diameter at outboard end 416. A cylindrical sleeve bushing 430 is positioned between shaft 410 and rotating sleeve 412 and extends from thrust washer 160 to segment 426 of rotating sleeve 412. In a preferred embodiment, sleeve bushing 430 is made of a self lubricating dense plastic such as polyphenylene sulfide (PPS). One example is Techtron® HPV, a bearing grade PPS. In another less preferred embodiment, a bushing of aramid reinforcing fibers, high temperature resin and solid lubricants, such as SlideRite HT® may be used. In a further, less preferred embodiment, a bushing of polytetrafluoroethlene (PTFE) material may be used.

Sleeve bushing 430 is maintained in position by inboard spacer 160 and segment 426 of rotating sleeve 412. Hub 284 of discharge ramp 272 is supported on segment 422 of rotating sleeve 420 with bushing 288 and held in place by spacers 290 as previously described in FIG. 4. In a preferred embodiment, bushing 288 is made of a self lubricating plastic such as polyphenylene sulfide (PPS). Because bushing 288 and sleeve bushing 430 are self lubricating, lubrication ports (see FIG. 1) are not required on shaft 410 or on hub 284 of discharge chute 272 (see FIG. 8). The elimination of lubrication ports provides added benefits in reduced maintenance and fabrication of shaft 410 is simplified with no requirements for shoulders or lubrication ports (see FIG. 1).

In a preferred embodiment for an extractor 10 with stainless steel contact components (see FIG. 1 and FIG. 2), center shaft 20 is about 1 9/16 inches in diameter, about 24-1/4 inches long and preferably made of stainless steel. Rotating sleeve 72 is about 2-1/4 inches outside diameter at the smallest 426 segment, about 3-1/2 inches outside diameter at the largest segment 420, about 9.625 inches long and preferably made of stainless steel. Can stripper 58 is made of 1/2" by 2" stainless steel bar and is formed to a radius of about 13-1/2 inches. Star wheel 150 is preferably made of stainless steel and is about 22-3/8 inches in diameter and about 3/4 inch thick. Each cut-out preferably has a radius of about 3.090 inches. In a more preferred embodiment, star wheel 150 is made of two sheets of 3/8 inches stainless steel welded or fastened together after manufacture. Clover wheel 100 is preferably made of stainless steel and is about 27-1/2 inches in diameter and about 1/2 inch thick. In a more preferred embodiment, clover wheel 100 is reversible and polished on both sides. Star wheel back plate 140 is about 27-1/2 inches in diameter and about 3/8 inch thick and preferably made of stainless steel. Most of the remaining parts in the assembly are preferably made of stainless steel except the spacers 160, 162, and 290, which are preferably made of cored bronze and center bushing 288 which is preferably made of dense plastic.

In a preferred embodiment of an extractor 10 with plastic contact components (see FIG. 1 and FIG. 3), clover wheel 210 is preferably made of a dense plastic such as nylon with embedded molybdenum disulfide and is about 27-1/4 inches in diameter and about 1.172 inches thick. Each recess in clover wheel 210 is about 1/8 inch deep. Star wheel back plate 230 is preferably made of a dense plastic such as nylon with embedded molybdenum disulfide and is about 27-1/4 inches in diameter and about 1 inch thick with a recess of about 0.375 inches deep. Most of the remaining parts in the assembly are preferably made of stainless steel except the spacers 160, 162, and 290, which are preferably made of cored bronze and the center bushing 288 which is preferably made of PPS. In another embodiment, spacers 160, 162 and 290 are made of dense plastic.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for extracting cylindrical cans from an atmospheric rotary cooker/cooler with a rotating reel comprising:
    a stationary center shaft coupled to the rotary cooker/cooler and aligned with the axis of the rotating reel;
    a sleeve adapted to rotate on said center shaft;
    means for extracting cans from said rotating reel, said means for extracting coupled to said sleeve;
    said means for extracting driven by the rotating reel;
    means for stripping a cylindrical can from the reel, said means for stripping coupled to said center shaft;
    wherein said means for stripping is adapted to position a cylindrical can within said means for extracting; and
    means for aligning adapted to align said means for extracting on said sleeve.

2. An apparatus as recited in claim 1, said means for extracting comprises:
    a planar circular clover wheel having a plurality of lobes, said clover wheel adapted to couple to said sleeve;
    wherein said lobes of said clover wheel are adapted to mesh with the rotating reel;
    a star wheel having a plurality of recesses, said star wheel adapted to couple to said sleeve;
    wherein a recess of said star wheel is configured to receive a cylindrical can;
    wherein each recess of said star wheel is adapted to correspond to a lobe of said clover wheel;
    a planar circular back plate coupled to said star wheel;
    wherein said means for stripping is adapted to position a cylindrical can between said clover wheel and said back plate and within a recess of said star wheel; and
    wherein a cylindrical can is extracted from the rotating reel when said means for stripping strips a can from the reel and positions the can between said clover wheel and said back plate and within a recess of said star wheel, and said clover wheel rotates in response to rotation of the reel.

3. An apparatus as recited in claim 2, said means for aligning comprising:
a keyless hub lock adapted to adjustingly couple said star wheel to said sleeve;
wherein said keyless; hub lock is adapted to align a recess of said star wheel to correspond to a lobe of said clover wheel.

4. An apparatus as recited in claim 3, comprising:
a discharge ramp positioned between said clover wheel and said star wheel;
wherein said discharge ramp is adapted to intercept cans positioned between a lobe in said clover wheel and a corresponding recess in said star wheel; and
means for supporting adapted to support said discharge ramp on said sleeve.

5. An apparatus as recited in claim 4, wherein said means for supporting comprises a plastic bushing.

6. An apparatus as recited in claim 4, wherein said means for supporting comprises a plurality of needle bearings.

7. An apparatus as recited in claim 2, said means for stripping a cylindrical can comprises:
a curved band having struts, said struts supported on said center shaft;
wherein said curved band is positioned to align with the circumference of said back plate;
wherein said curved band is oriented perpendicular to said center shaft;
wherein said curved band is adapted to maintain a cylindrical can in a recess of said star wheel;
said curved band having at least a distal end; and
wherein said distal end of said curved band is adapted to intercept cylindrical cans positioned on the rotating reel.

8. An apparatus as recited in claim 7, wherein said curved band comprises stainless steel.

9. An apparatus as recited in claim 2, wherein said star wheel, said back plate and said clover wheel comprise stainless steel.

10. An apparatus as recited in claim 9:
said back plate having a contact surface adjacent said star wheel;
wherein said contact surface of said back plate is polished;
said clover wheel having a contact surface facing said star wheel; and
wherein said contact surface of said clover wheel is polished.

11. An apparatus as recited in claim 10, wherein said clover wheel is adapted to be reversible and both surfaces of said clover wheel are polished.

12. An apparatus as recited in claim 2, wherein said back plate and said clover wheel comprise plastic.

13. An apparatus as recited in claim 12, wherein said back plate and said clover wheel comprise a nylon polymer embedded with molybdenum disulfide.

14. An apparatus as recited in claim 2, wherein said sleeve is supported on said central shaft by a sleeve bushing.

15. An apparatus as recited in claim 14, wherein said sleeve bushing material is selected from the group consisting essentially of a polyphenylene sulfide plastic, aramid reinforcing fibers, and polytetrafluoroethylene.

16. An apparatus for extracting cylindrical cans from an atmospheric rotary cooker/cooler with a rotating reel comprising:
a stationary center shaft coupled to the rotary cooker/cooler and aligned with the axis of the rotating reel;
a sleeve, said sleeve adapted to rotate on said center shaft;
a planar circular clover wheel having a plurality of evenly-spaced lobes, said clover wheel adapted to couple to said sleeve;
wherein said lobes of said clover wheel are configured to mesh with the rotating reel;
a star wheel adapted to adjustingly couple to said sleeve;
wherein said star wheel has a plurality of evenly-spaced recesses;
wherein each recess; of said star wheel is adapted to correspond to a lobe of said clover wheel;
a planar circular back plate coupled to said star wheel;
means for stripping a cylindrical can from the reel, said means for stripping coupled to said center shaf;
wherein said means for stripping is adapted to position a cylindrical can between said clover wheel and said sack plate and within a recess of said star wheel; and
wherein a cylindrical can is extracted from the rotating reel when said means for stripping strips a can from the reel and said clover wheel rotates in response to rotation of the reel.

17. An apparatus as recited in claim 16, said means for stripping a cylindrical can comprises:
a curved band having struts, said struts supported on said center shaft;
wherein said curved band is positioned to align with the circumference of said back plate;
wherein said curved band is oriented perpendicular to said center shaft;
wherein said curved band is adapted to maintain a cylindrical can in a recess of said star wheel;
said curved band having at least a distal end; and
wherein said distal end of said curved band is adapted to intercept cylindrical cans positioned on the rotating reel.

18. An apparatus as recited in claim 17, wherein said curved band comprises stainless steel.

19. An apparatus as recited in claim 16, wherein said sleeve, said star wheel, said back plate and said clover wheel comprise stainless steel.

20. An apparatus as recited in claim 19:
said back plate having a contact surface adjacent said star wheel;
wherein said contact surface of said back plate is polished;
said clover wheel having a contact surface facing said star wheel; and
wherein said contact surface of said clover wheel is polished.

21. An apparatus as recited in claim 20, wherein said clover wheel is adapted to be reversible and both surfaces of said clover wheel are polished.

22. An apparatus as recited in claim 16, wherein said back plate and said clover wheel comprise plastic.

23. An apparatus as recited in claim 22, wherein said back plate and said clover wheel comprise nylon embedded with molybdenum disulfide.

24. An apparatus as recited in claim 16, further comprising:
a keyless hub lock adapted to couple to said sleeve;
wherein said keyless; hub lock is further adapted to adjustably couple said star wheel to said sleeve.

25. An apparatus as recited in claim 16, further comprising:
a discharge ramp supported on said sleeve;
wherein said discharge ramp is positioned between said clover wheel and said star wheel; and wherein said discharge ramp is adapted to intercept cans positioned between a lobe of said clover wheel and a corresponding recess in said star wheel.

26. An apparatus as recited in claim 25, further comprising a plastic bushing supporting said discharge ramp on said sleeve.

27. An apparatus as recited in claim 26, wherein said bushing material is selected from the group consisting essentially of a polyphenylene sulfide plastic, aramid reinforcing fibers, and polytetrafluoroethylene.

28. An apparatus as recited in claim 16, wherein said sleeve is supported on said central shaft by a sleeve bushing.

29. An apparatus as recited in claim 28, wherein said sleeve bushing material is selected from the group consisting essentially of a polyphenylene sulfide plastic, aramid reinforcing fibers, and polytetrafluoroethylene.

30. An apparatus for extracting cylindrical cans, having a rim at each end, from an atmospheric rotary cooker/cooler with a rotating reel comprising:
    a stationary center shaft coupled to the rotary cooker/cooler and aligned with the axis of the rotating reel;
    a sleeve adapted to rotate on said center shaft;
    a clover wheel hub coupled to said center sleeve;
    a clover wheel coupled to said clover wheel hub;
    said clover wheel having a plurality of evenly spaced lobes;
    wherein said lobes are adapted to mesh with the rotating reel;
    a planar star wheel flange coupled to said sleeve;
    a star wheel adjustably coupled to said star wheel flange;
    wherein rotation of said star wheel is synchronized with rotation of said clover wheel through said sleeve:
    said star wheel having a plurality of evenly spaced points;
    a circular recess positioned between each two adjacent points;
    wherein each recess on said star wheel corresponds with a lobe on said clover wheel;
    wherein each recess on said star wheel is adapted to receive one rim of a cylindrical can;
    wherein said star wheel and said clover wheel are spaced apart to receive a cylindrical can;
    a curved band having struts, said struts supported on said center shaft;
    said curved band positioned to align with the circumference of said star wheel flange;
    said curved band oriented perpendicular to said center shaft;
    said curved band having at least a distal end; and
    wherein said distal end of said curved band is adapted to intercept a rim of a cylindrical can positioned on the rotating reel.

31. An apparatus as recited in claim 30, comprising:
    a discharge ramp positioned between said clover wheel and said star wheel;
    wherein said discharge ramp is adapted to intercept cans positioned between a lobe on said clover wheel and a corresponding recess in said star wheel;
    a bushing positioned between said discharge ramp and said sleeve;
    wherein said bushing is configured to support said discharge ramp on said sleeve.

32. An apparatus as recited in claim 31, wherein said bushing material is selected from the group consisting essentially of a polyphenylene sulfide plastic, aramid reinforcing fibers, and polytetrafluoroethylene.

33. An apparatus as recited in claim 30:
    wherein said sleeve comprises stainless steel; and
    wherein said star wheel flange is coupled to said sleeve with an adjustable keyless hub/shaft locking device.

34. An apparatus as recited in claim 30, wherein said star wheel, said star wheel flange and said clover wheel comprise stainless steel.

35. An apparatus as recited in claim 34:
    said star wheel flange having a contact surface adjacent said star wheel;
    wherein said contact surface of said star wheel flange is polished;
    said clover wheel having a contact surface facing said star wheel; and
    wherein said contact surface of said clover wheel is polished.

36. An apparatus as recited in claim 35, wherein said clover wheel is adapted to be reversible and both surfaces of said clover wheel are polished.

37. An apparatus as recited in claim 30:
    said star wheel flange and said clover wheel comprise plastic; and
    said star wheel comprises stainless steel.

38. An apparatus as recited in claim 37, wherein said star wheel flange and said clover wheel comprise nylon embedded with molybdenum disulfide.

39. An apparatus as recited in claim 30, wherein said sleeve is supported on said central shaft by a sleeve bushing.

40. An apparatus as recited in claim 39, wherein said sleeve bushing material is selected from the group consisting essentially of a polyphenylene sulfide plastic, aramid reinforcing fibers, and polytetrafluoroethylene.

41. An apparatus for extracting cylindrical cans from ah atmospheric rotary cooker/cooler with a rotating reel comprising:
    a stationary center shaft coupled to the rotary cooker/cooler and aligned with the rotating reel;
    a sleeve adapted to rotate on said center shaft;
    a clover hub coupled to said sleeve;
    a clover wheel coupled to said clover hub;
    said clover wheel having a plurality of evenly spaced lobes;
    wherein said lobes are adapted to mesh with the rotating reel;
    a star wheel flange coupled to said sleeve with a keyless hub/shaft locking device;
    a star wheel coupled to said star wheel flange;
    wherein said star wheel has a plurality of evenly-spaced circular recesses;
    wherein each recess on said star wheel is aligned to correspond with a lobe on said clover wheel by adjusting said keyless hub/shaft locking device;
    wherein said star wheel and said clover wheel are spaced apart to receive a cylindrical can;
    a can stripper having struts, said struts supported on said center shaft;
    wherein said can stripper is positioned to align with the circumference of said star wheel flange;
    wherein said can stripper is oriented perpendicular to said center shaft;
    wherein said can stripper is adapted to maintain a cylindrical can in a recess of said star wheel;
    said can stripper having at least a distal end; and
    wherein said distal end of said can stripper is adapted to intercept cylindrical cans positioned on the rotating reel.

42. An apparatus as recited in claim 41:
said star wheel and said can stripper comprises stainless steel; and
said star wheel flange and said clover wheel comprise plastic embedded with molybdenum disulfide.

43. An apparatus as recited in claim 41:
said star wheel and said can stripper comprises stainless steel; and
said star wheel flange and said clover wheel comprise stainless steel.

44. An apparatus as recited in claim 43:
said star wheel flange and said clover wheel having contact surfaces; and
wherein said contact surfaces are polished.

45. An apparatus as recited in claim 44, wherein said clover wheel is adapted to be reversible with contact surfaces on both sides.

46. An apparatus as recited in claim 41, comprising:
a discharge ramp positioned between said clover wheel and said star wheel;
a bushing adapted to support said discharge ramp on said sleeve; and
wherein said discharge ramp comprises stainless steel.

47. An apparatus as recited in claim 41:
wherein said sleeve is adapted to rotate on said center shaft with a plurality of needle bearings; and
wherein said sleeve comprises stainless steel.

48. An apparatus as recited in claim 47, wherein said center shaft comprises a plurality of lubrication ports that fluidly communicate with said needle bearings.

* * * * *